(12) United States Patent
Gilfix et al.

(10) Patent No.: US 7,742,417 B2
(45) Date of Patent: Jun. 22, 2010

(54) BURST TRAFFIC SMOOTHING FOR SIP PROCESSING ELEMENTS

(75) Inventors: Michael A. Gilfix, Austin, TX (US); Ronnie A. Jones, Durham, NC (US); Amir Perlman, Yahud (IL); Rhys D. Ulerich, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 617 days.

(21) Appl. No.: 11/676,076

(22) Filed: Feb. 16, 2007

(65) Prior Publication Data

US 2008/0198748 A1 Aug. 21, 2008

(51) Int. Cl.
*H04L 12/26* (2006.01)
(52) U.S. Cl. .................. 370/235; 370/412; 370/428
(58) Field of Classification Search .......... 370/230, 370/230.1, 235, 235.1, 412, 413, 428, 429
See application file for complete search history.

(56) References Cited

U.S. PATENT DOCUMENTS

| | | | | |
|---|---|---|---|---|
| 5,546,389 | A | * | 8/1996 | Wippenbeck et al. ....... 370/412 |
| 5,629,936 | A | * | 5/1997 | Lee et al. .................... 370/230 |
| 5,828,653 | A | * | 10/1998 | Goss .......................... 370/230 |
| 2002/0101865 | A1* | | 8/2002 | Takagi et al. ............... 370/360 |
| 2003/0058793 | A1* | | 3/2003 | Rochon et al. ............. 370/229 |
| 2005/0105464 | A1 | | 5/2005 | Acharya et al. |
| 2005/0237999 | A1 | | 10/2005 | Shores et al. |
| 2006/0227766 | A1* | | 10/2006 | Mickle et al. ............... 370/356 |
| 2006/0245418 | A1 | | 11/2006 | Kucmerowski et al. |
| 2006/0274678 | A1 | | 12/2006 | Holloway et al. |

OTHER PUBLICATIONS

Floyd et al., "Random Early Detection Gateways for Congestion Avoidance", IEEE/ACM Transactions on Networking, Aug. 1993, pp. 1-22.

* cited by examiner

*Primary Examiner*—Kwang B Yao
*Assistant Examiner*—Andrew Lai
(74) *Attorney, Agent, or Firm*—Stephen J. Walder, Jr.; David A. Mims, Jr.

(57) ABSTRACT

Mechanisms for burst traffic smoothing for Session Initiation Protocol (SIP) processing elements are provided. A dispatch queue management engine determines whether a received packet is a TCP or UDP packet. If the packet is a TCP packet, the packet is automatically added to the dispatch queue. If the packet is a UDP packet, a value for a drop function $f$ is generated and a random or pseudo-random number $r$ is generated. If $r$ has a predetermined relationship to $f$, then the UDP packet is added to the dispatch queue, otherwise the UDP packet is discarded. The value for $f$ is based on the current dispatch queue load, the network quality, the retransmission rate, and the allowable drop rate. Thus, the determination as to whether to drop UDP packets or not is configurable by an administrator and also adaptable to the current network and dispatch queue conditions.

35 Claims, 4 Drawing Sheets

BURST TRAFFIC SMOOTHING FOR SIP PROCESSING ELEMENTS

BACKGROUND

1. Technical Field

The present application relates generally to an improved data processing system and method. More specifically, the present application is directed to a system and method for burst traffic smoothing for session initiation protocol (SIP) signaling elements.

2. Description of Related Art

Session Initiation Protocol (SIP) is an application-layer control (signaling) protocol for creating, modifying, and terminating sessions with one or more participants. These sessions include Internet telephone calls (also referred to as "telephony"), multimedia distribution, multimedia conferencing, and the like (see RFC 3261 available from the IETF SIP Working Group at www.ietf.org/rfc/rfc3261.txt). In November 2000, SIP was accepted as a third generation partnership project (3GPP) signaling protocol and permanent element of the IP Multimedia Subsystem (IMS) architecture. SIP is widely used as a signaling protocol for Voice over IP (VoIP), along with H.323 and others. SIP is addressing neutral, with addresses expressed as URL/URIs of various types, such as H.323 address, E.164 telephone numbers, electronic mail type addresses, or the like.

SIP clients traditionally use Transmission Control Protocol (TCP) and User Datagram Protocol (UDP) port 5060 to connect to SIP servers and other SIP endpoints in a data network. SIP is primarily used in setting up and tearing down voice or video calls. However, it can be used in any application where session initiation is a requirement, such as event subscription and notification, terminal mobility, and the like. All voice/video communications are done over separate session protocols, typically real time transport protocol (RTP).

A motivating goal for SIP was to provide a signaling and call setup protocol for Internet Protocol (IP) based communications that can support a superset of the call processing functions and features present in the public switched telephone network (PSTN). SIP by itself does not define these features since its focus is call-setup and signaling. However, it has been designed to enable the building of such features in network elements known as Proxy Servers and User Agents. These are features that permit familiar telephone-like operations including dialing a number, causing a phone to ring, hearing ringback tones or a busy signal, etc.

SIP-enabled telephony networks can also implement many of the more advanced call processing features present in signaling system 7 (SS7), though the two protocols themselves are very different. SS7 is a highly centralized protocol, characterized by highly complex central network architecture and dumb endpoints, i.e. the traditional telephone handsets. SIP is a peer-to-peer protocol. As such it requires only a very simple, and thus highly scalable, core network with intelligence distributed to the network edge, i.e. embedded in endpoints (terminating devices built in either hardware or software). SIP features are implemented in the communicating endpoints (i.e. at the edge of the network) as opposed to traditional SS7 features which are implemented in the network.

SIP works in concert with several other protocols and is only involved in the signaling portion of a communication session. SIP acts as a carrier for the Session Description Protocol (SDP), which describes the media content of the session, e.g. what IP ports to use, the codec being used, and the like. In typical use, SIP "sessions" are simply packet streams of the Real-time Transport Protocol (RTP). RTP is the carrier for the actual voice or video content itself.

While SIP provides a very useful communication protocol via which multimedia communications may be performed, such as VoIP or video communications, problems may occur with SIP with regard to dropped communications. That is, when the SIP traffic being handled by a SIP server exceeds a maximum amount of traffic that the dispatch queues of the SIP server can handle, SIP sessions start to get dropped, i.e. communications are dropped. For example, as is generally known, data communications are often susceptible to bursts of traffic, i.e. large increases in data transmissions over a short amount of time.

When SIP traffic experiences a burst, the dispatch queues of a SIP server may get overloaded and, as a result, the SIP traffic data packets may get dropped and SIP communications are dropped as a consequence. In order to compensate for such bursts, the SIP environment, i.e. the dispatch queues of the SIP server, number of SIP servers, etc., are sized taking into account expected burst loads at the largest sizing consideration. If the current configuration cannot handle the largest expected burst of SIP traffic, additional SIP server systems must be added. However, most of the time the system is in operation, the extra capacity in place to handle traffic bursts goes unutilized. Thus, there are wasted resources that increase cost of the overall system.

SUMMARY

The illustrative embodiments provide a system and method for burst traffic smoothing for session initiation protocol (SIP) elements. The mechanisms of the illustrative embodiments use SIP user datagram protocol (UDP) retransmission characteristics, combined with measurable network loss and system load characteristics, to adaptively smooth UDP burst traffic to improve processing of SIP communications. With the mechanisms of the illustrative embodiments, fewer SIP servers or processors are able to handle higher average loads that exhibit periodic traffic bursts than in the known systems that overcompensate for traffic bursts.

As a result of using the mechanisms of the illustrative embodiments, traffic bursts are no longer the main sizing consideration in configuring a SIP system since traffic bursts are better handled by the smoothing mechanisms of the illustrative embodiments. Given a particular TCP/UDP load profile with specified "burstiness," one can pre-calculate how smoothed the "burstiness" becomes using the mechanisms of the illustrative embodiments and may use this smoothness of the "burstiness" as a factor in sizing the SIP system.

As mentioned above, SIP clients traditionally use Transmission Control Protocol (TCP) and User Datagram Protocol (UDP) to connect to SIP servers and other SIP endpoints in a data network. UDP is one of the core protocols of the Internet protocol suite. Using UDP, programs on networked computers can send short messages sometimes referred to as datagrams, to one another.

UDP does not provide the reliability and ordering guarantees that TCP does. UDP datagrams may arrive out of order or go missing without notice. Without the overhead of checking if every packet actually arrived, UDP is faster and more efficient for many lightweight or time-sensitive purposes. Also, UDP's stateless nature is useful for servers that answer small queries from huge numbers of clients. UDP is typically used for broadcast (send to all devices on a local network) and multicast (send to all subscribers). Common network applications that use UDP include the Domain Name System (DNS), streaming media applications, Voice over IP (VoIP), Trivial File Transfer Protocol (TFTP), and online games.

With regard to the illustrative embodiments, the nature of UDP datagrams is utilized to determine which data packets to drop if a SIP dispatch queue of a SIP server becomes overloaded. That is, SIP dispatch queues may accept two kinds of SIP messages: TCP and UDP messages. Since TCP messages will never be retransmitted by another SIP element once they are accepted into the dispatch queue, it is important to preserve TCP messages in the dispatch queue as much as possible. Any TCP message discarded from the dispatch queue may result in a communication failure of some sort. With UDP, however, because of its retransmission characteristics, there is a good chance that any given UDP message will be retransmitted.

With the illustrative embodiments, the dispatch queue SIP container measures the average UDP packet loss at low load times, i.e. the dispatch queue load or length q being less than a predetermined threshold, in order to get a measure of the network quality n, where n is the network packet loss in the range of 0 to 1. The network quality represents how likely a single UDP packet is to be lost throughout the container's operating environment.

The SIP server may calculate the likelihood that any given UDP packet is the last one transmitted before timeout, i.e. the SIP retransmission rate l in the range of 0 to 1, without explicitly knowing if the packet is a retransmission or not. This calculation may be based on the known SIP T1, T2, and 64*T1 request timeout timers, which are described in the SIP specifications. For example, if T1 and T2 mandate that the protocol gives 7 retransmissions, then any given UDP packet has a 1 in 7 chance of being the last one transmitted before a timeout for a given message. This assumes, however, that clients always perform the number of retransmissions mandated by the protocol.

The container may utilize a specified allowable dropped message rate, d, which may be related to application reliability requirements. This specified allowable dropped message rate may be input to the container, the value of which may be determined in any manner suitable as determined by those of ordinary skill in the art. For example, an allowable dropped message rate may be provided as d=0.99999 meaning that 99.999% of all messages need to be processed successfully.

Given the known present dispatch queue length and the known maximum fixed dispatch queue size, the container may measure how full the queue is, i.e. the dispatch queue load q as a measure from 0 to 1. These parameters, q, n, l and d, may be fed to a specified function $f(q, n, l, d)$ which gives the probability that the container will keep any given UDP packet for a known queue load (or length), network packet loss, SIP retransmission rate, and allowable dropped message rate. This specified function may take the form, for example, of $f(q)=(1-q)^c$ where $c<1$ and depends on n, l and d. This function results in UDP packets being dropped more frequently as the load on the dispatch queue increases.

With this function in place, any incoming TCP packets are inserted into the dispatch queue since dropping a TCP packet automatically fails a communication. The dispatch queue container may generate a random number r in the range from 0 to 1. The container may then calculate the value for $f(q, n, l, d)$ given the instantaneous dispatch queue load or length q and the fixed n, l, and d values. Any incoming UDP packet may be kept and inserted into the dispatch queue if r<f. If r>f, then the UDP packet is discarded because it has been determined, statistically, that by doing so an unacceptable number of communications will not be failed. It should be noted that, rather than calculating the value of $f()$ for each determination, a lookup table may be provided and stored in memory for use in performing the determinations as to whether to drop or keep UDP packets.

Effectively, the function $f(q, n, l, d)$ states that given what is known about the network, the SIP protocol, the dispatch queues loading, and the reliability requirements, with what probability should processing a packet be skipped because it is expected (with d certainty) that a retransmission of the packet will be processed prior to the request timing out. With this function, as the dispatch queue load increases, UDP packets are more aggressively dropped under the assumption that retransmissions of these UDP packets will be seen later (when presumably there is less load). Because the dropping behavior is adaptively changed based on known factors, one can control the risk that processing of a request will fail outright based on operational needs.

Altogether, one can reduce the number of physical systems needed to handle SIP traffic with bursty behavior using the mechanisms of the illustrative embodiments. As a result, the illustrative embodiments improve the perceived system performed and reduce the number of systems necessary to handle fairly constant load with somewhat spiky moments.

In one illustrative embodiment, a method for managing a dispatch queue is provided. The method may comprise determining a drop function value based on a current loading of the dispatch queue, evaluating the drop function value to determine if one or more data packets are to be dropped, and dropping one or more data packets of a first type if the evaluation indicates that one or more data packets are to be dropped. Data packets of a second type may always be added to the dispatch queue regardless of whether the evaluation indicates that one or more data packets are to be dropped. Data packets of the first type may be User Datagram Protocol (UDP) data packets and data packets of the second type may be Transport Control Protocol (TCP) data packets. The method may be implemented in a Session Initiation Protocol (SIP) container.

Evaluating the drop function value may comprise generating a random or pseudo-random value, comparing the random or pseudo-random value to the drop function value, and determining that one or more data packets are to be dropped if the random or pseudo-random value has a predetermined relationship with regard to the drop function value. The predetermined relationship may be that the random or pseudo-random value is greater than the drop function value.

The drop function value may be determined using a drop function that operates on one or more network loss and system load characteristic parameters. The network loss characteristic parameter may be measured as an average packet loss at a point in time where a dispatch queue length is less than a predetermined threshold. The system load characteristic parameter may be determined dynamically.

The drop function may specify a probability that a SIP container will keep any given User Datagram Protocol (UDP) packet for a determined dispatch queue length. The drop function may result in UDP packets being dropped more frequently as the system load increases.

The drop function value may be determined based on a function of the current loading of the dispatch queue, a network quality value, a retransmission rate value, and an allowable drop rate value. The drop function may be, for example:

$$f(q)=(1-q)^c$$

wherein q is the current loading of the dispatch queue, and wherein c<1 and c depends on the network quality value, the retransmission rate value, and the allowable drop rate value.

The method may be performed in response to a determination of a state indicative of an overload or imminent overload of the dispatch queue. Determining a drop function value based on a current loading of the dispatch queue may comprise performing a lookup operation on one or more lookup table data structures based on a current loading of the dispatch queue.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, an apparatus is provided. The apparatus may comprise a processor and a memory coupled to the processor. The memory may comprise instructions which, when executed by the processor, cause the processor to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

Figure 1:
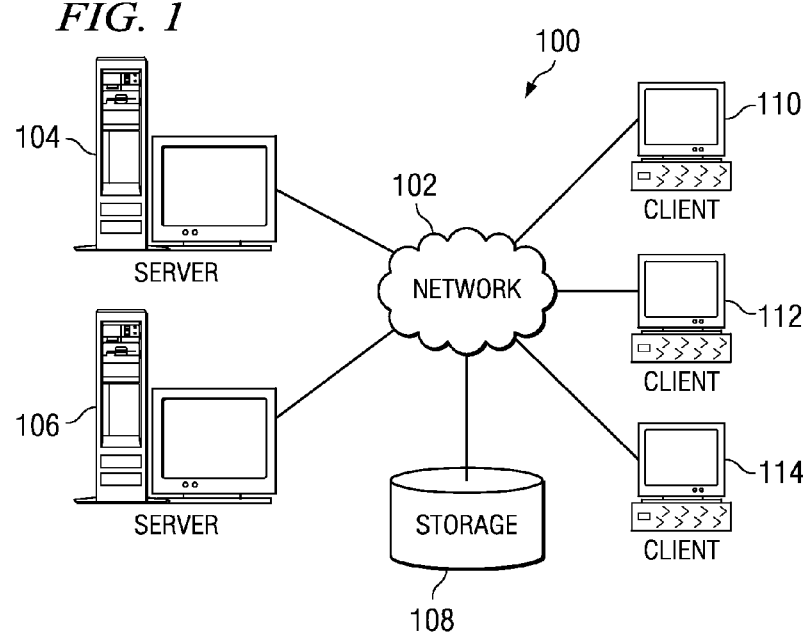
FIG. 1 is an exemplary diagram depicting a pictorial representation of an exemplary distributed data processing system in which aspects of the illustrative embodiments may be implemented.
Figure 2:
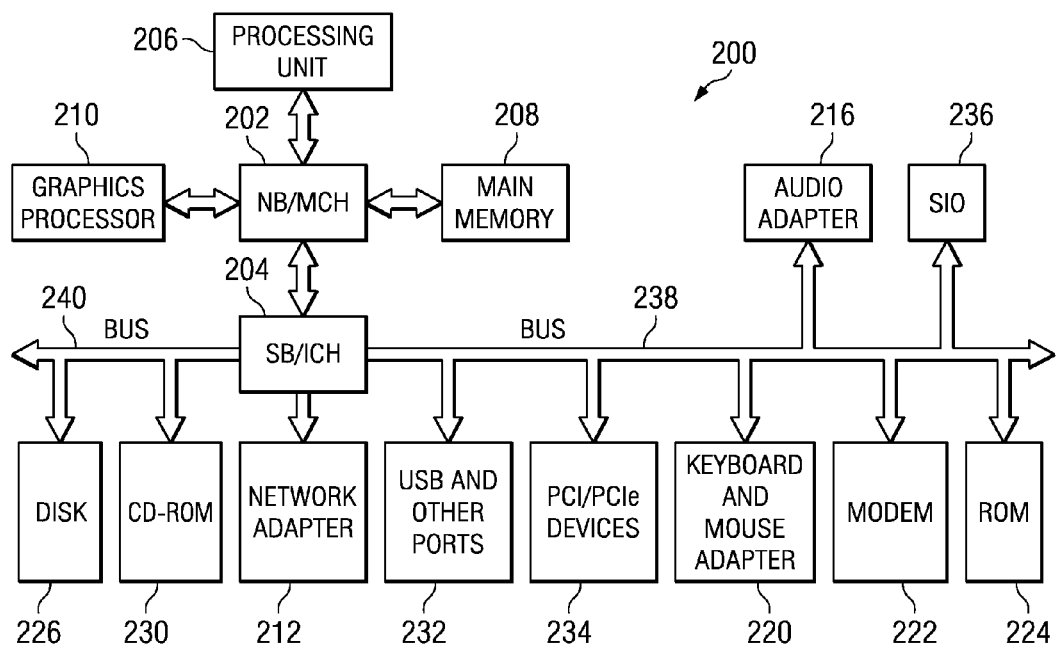
FIG. 2 is a block diagram of an exemplary data processing system in which aspects of the illustrative embodiments may be implemented.

The illustrative embodiments provide a system and method for performing burst traffic smoothing in session initiation protocol (SIP) elements of a data processing system. As such, the mechanisms of the illustrative embodiments are especially well suited for use in a distributed data processing environment in which data is transmitted between computing devices via one or more data networks. As a context in which to understand the details of the illustrative embodiments, FIGS. 1 and 2 are provided hereafter as examples of distributed data processing environments in which aspects of the illustrative embodiments may be implemented. A more detailed description of the illustrative embodiments is provided thereafter.

With reference now to the figures and in particular with reference to FIGS. 1-2, exemplary diagrams of data processing environments are provided in which illustrative embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

It should be appreciated that, with regard to the illustrative embodiments described hereafter, server 104 and server 106 may in fact constitute a plurality of server computing devices for implementing a SIP processing environment. For example, server 104 may comprise a first set of one or more server computing devices that serve as load balancers, coupled to a second set of one or more server computing devices that serve as SIP proxies, and a third set of one or more server computing devices that serve as SIP application servers and data storage computing devices. An example of such an arrangement will be described in greater detail hereafter with regard to FIG. 3.

With reference now to FIG. 2, a block diagram of an exemplary data processing system is shown in which aspects of the illustrative embodiments may be implemented. Data processing system 200 is an example of a computer, such as a computer provided as server 104 or 106 in FIG. 1, for example, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
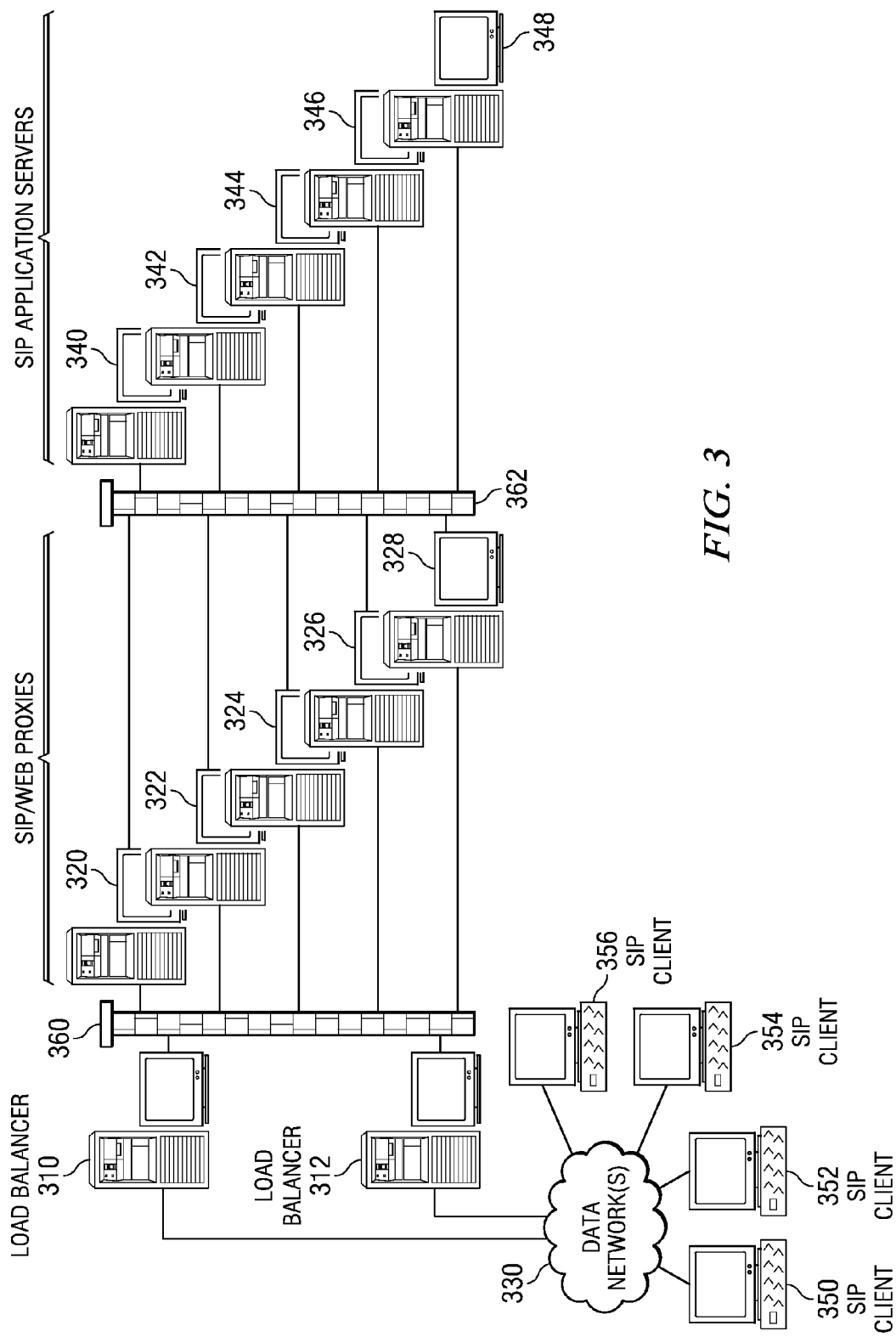
FIG. 3 is an exemplary block diagram of a SIP architecture that may be utilized with the distributed data processing environment of FIG. 1 and which may utilize the data processing device of FIG. 2.

FIG. 3 is an exemplary block diagram of a SIP architecture that may be utilized with the distributed data processing environment of FIG. 1 and which may utilize the data processing device of FIG. 2. The server computing devices shown in FIG. 3 may be part of servers 104 and 106 in FIG. 1, as previously mentioned above, for example. FIG. 3 is provided as one example of a SIP architecture in which the exemplary aspects of the illustrative embodiments may be implemented and is not intended to state or imply any limitation with regard to the types of SIP architectures in which the present invention may be implemented.

As shown in FIG. 3, the SIP architecture comprises a plurality of edge components including one or more load balancer systems 310-312 and one or more SIP/Web proxy systems 320-328. The load balancer systems 310-312 are coupled to one or more data networks 330 and the one or more SIP/Web proxy systems 320-328. The SIP/Web proxy systems 320-328 are further coupled to one or more SIP application systems 340-348. SIP clients 350-356 may communicate with the SIP application systems 340-348 by sending and receiving SIP and/or Hypertext Transport Protocol (HTTP) messages to the load balancer systems 310-312 via the one or more data networks 330, and from the load balancer systems 310-312 to the SIP/Web proxy systems 320-328. Various security mechanisms, such as firewalls 360-362 may be provided at locations within the SIP architecture to ensure the integrity of SIP applications and data of the SIP application systems 340-348.

The SIP clients 350-356 connect to the SIP application systems 340-348 to participate in instant messaging, presence, and Web conference activities, for example. Moreover, in some applications, the SIP clients 350-356 may connect to the SIP application systems 340-348 to perform voice over IP (VoIP) communications. Any type of multimedia communication may be performed using SIP and the SIP architecture shown in FIG. 3, or similar such architectures.

The load balancer systems 310-312 may operate as network dispatchers which receive the TCP connections from the SIP clients 350-356 and distributes them across the SIP/Web proxy systems 320-328. In a network deployment, an administrator may specify the address and port number of one or more of the load balancer systems 310-312 as the SIP application system 340-348 listening address and port. The SIP clients 350-356 may use the load balancer system 310-312 address to connect to the SIP/Web proxy system 320-328 of the SIP application system 340-348 through the load balancer system 310-312.

Typically, when a SIP application is deployed on a SIP application system 340-348, the SIP application is deployed in association with a SIP container. The SIP container comprises the SIP servlets that perform SIP signaling to the backend SIP applications of the SIP application system 340-348. The SIP container examines SIP messages received from the SIP/Web proxy system 320-328 and routes these message to an appropriate SIP servlet. Similarly, the SIP container routes messages that have been processed by the backend SIP applications outbound to an appropriate SIP client 350-356 or SIP/Web proxy system 320-328.

When a SIP container receives a SIP message from a SIP/Web proxy system 320-328, the SIP container examines the SIP message and, depending on the SIP message, routes the message to one of several SIP servlets that are contained in the SIP container. The SIP servlet interprets the SIP message and then interacts with the backend SIP server applications to ensure that the message is processed properly.

The SIP/Web proxy systems 320-328 operate as intermediaries between the SIP clients 350-356 and the SIP containers provided in the SIP application systems 340-348. All SIP clients 350-356 that use the SIP applications of the SIP application systems 340-348 establish a SIP connection through the SIP/Web proxy systems 320-328 and transmit data into the SIP container through the SIP/Web proxy systems 320-328. The load balancer systems 310-312 serve to distribute the load over the SIP/Web proxy systems 320-328.

When a SIP/Web proxy system 320-328 is initiated, it reads configuration information for the SIP architecture to determine the location of all SIP containers and then establishes a single persistent TCP connection with each SIP container. The SIP/Web proxy system 320-328 multiplexes all SIP data it receives from the multiple SIP client connections and forwards this data to the SIP containers over their single physical connection it maintains with the SIP container. This arrangement places the client connection handling load on the SIP/Web proxy and frees the SIP container to concentrate on the task of processing the SIP data.

The SIP/Web proxy system 320-328 is stateless because it performs minimal logical processing of the incoming SIP messages before multiplexing the data and forwarding it to the SIP container. The SIP/Web proxy system 320-328 further maintains and monitors affinity relationships between SIP containers and their SIP clients 350-356 so that inbound and outbound messages can be routed to the SIP clients 350-356. This functionality ensures that messages are routed correctly to users who are connected to different SIP application systems 340-348 in a network deployment environment.

To support message routing, all of the SIP/Web proxy systems 320-328 access the same affinity table data structure. This affinity table data structure records the SIP client to SIP application system connections for every SIP client. When a SIP/Web proxy system 320-328 receives a message from a SIP client 350-356, the SIP/Web proxy system 320-328 reads the recipient's SIP address, or Uniform Resource Identifier (URI) and looks up the recipient in the affinity table data structure to determine the SIP container to which the request must be routed to reach its recipient. The SIP/Web proxy system 320-328 maintains the affinity between a SIP container and its SIP clients 350-356 for the duration of a session. Thus, after a SIP/Web proxy system 320-328 determines the SIP container to which it must route messages for a given recipient URI, it continues to route all messages for this URI to the same SIP container until the session ends. More information about SIP containers, SIP proxies SIP servlets, SIP applications, and other elements of SIP architectures may be found in RFC 3261 available from the IETF at www.ietf.org/rfc/rfc3261.txt.

With this architecture in mind, the illustrative embodiments, provide a system and method for burst traffic smoothing for session initiation protocol (SIP) elements. The mechanisms of the illustrative embodiments use SIP user datagram protocol (UDP) retransmission characteristics, combined with measurable network loss and system load characteristics, to adaptively smooth UDP burst traffic to improve processing of SIP communications. With the mechanisms of the illustrative embodiments, fewer SIP application systems 340-348, i.e. SIP servers or processors, are able to handle higher average loads that exhibit periodic traffic bursts than in the known systems that overcompensate for traffic bursts.

As a result of using the mechanisms of the illustrative embodiments, traffic bursts are no longer the main sizing consideration in configuring a SIP system since traffic bursts are better handled by the smoothing mechanisms of the illustrative embodiments. Given a particular TCP/UDP load profile with specified "burstiness," one can pre-calculate how smoothed the "burstiness" becomes using the mechanisms of the illustrative embodiments and may use this smoothness of the "burstiness" as a factor in sizing the SIP system.

As mentioned above, SIP clients 350-356 traditionally use Transmission Control Protocol (TCP) and User Datagram Protocol (UDP) to connect to SIP application systems 340-348 and other SIP endpoints in a data network. UDP is one of the core protocols of the Internet protocol suite. Using UDP, programs on networked computers can send short messages sometimes referred to as datagrams, to one another.

With regard to the illustrative embodiments, the nature of UDP datagrams is utilized to determine which data packets to drop if a SIP dispatch queue of a SIP application system 340-348 becomes overloaded. That is, SIP dispatch queues may accept two kinds of SIP messages: TCP and UDP messages. Since TCP messages will never be retransmitted by another SIP element, e.g., the SIP/Web proxy system 320-328 or SIP client 350-356, once they are accepted into the dispatch queue of a SIP application system 340-348, it is important to preserve TCP messages in the dispatch queue as much as possible. Any TCP message discarded from the dispatch queue may result in a communication failure of some sort.

With UDP, however, because of its retransmission characteristics, there is a good chance that any given UDP message will be retransmitted. The illustrative embodiments leverage this retransmission characteristic into a mechanism for dropping packets during times when the traffic to a SIP application system exhibits a spike or burst such that the number of dropped communications is minimized.

Figure 4:
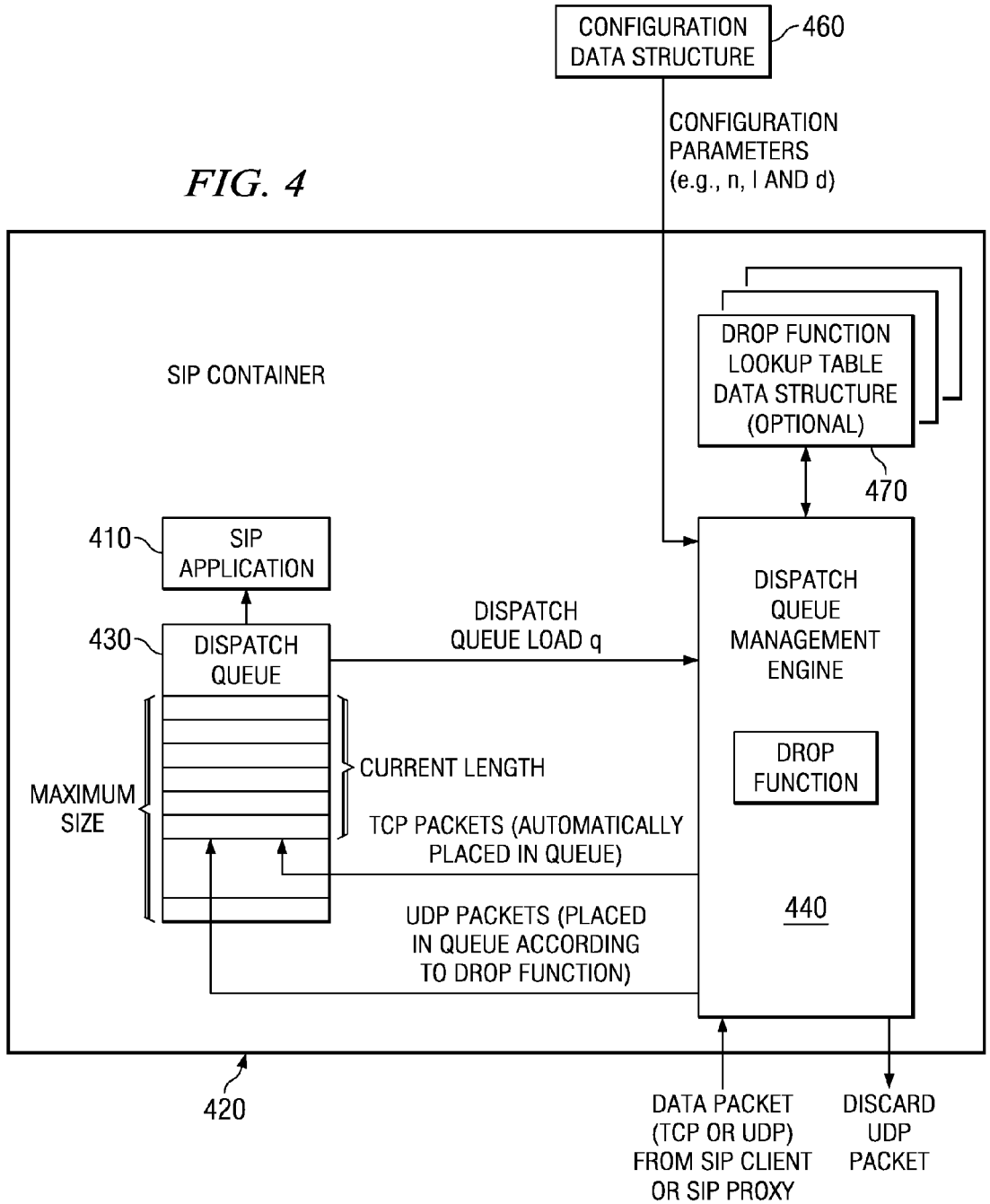
FIG. 4 is an exemplary block diagram illustrating an operation of the primary operational components of one illustrative embodiment.

FIG. 4 is an exemplary block diagram illustrating an operation of the primary operational components of one illustrative embodiment. As shown in FIG. 4, the primary operational components include a SIP application instance 410, an associated SIP container 420, a dispatch queue 430, and a dispatch queue management engine 440. As shown, the dispatch queue management engine 440 may be a service provided by the SIP container 420 for managing the dispatch queue 430. The SIP application instance 410 receives SIP messages from SIP clients via the dispatch queue 430 and the SIP container 420. SIP messages are placed in the dispatch queue 430 by a SIP/Web proxy system for processing by the SIP container 420 which provides the SIP messages to the SIP application instance 410.

The dispatch queue management engine 440 manages the load on the dispatch queue 430 by determining if the dispatch queue is overloaded or within a predetermined tolerance of being overloaded, and dropping UDP packets when such an overload or imminent overload condition is detected. The dispatch queue management engine 440 is adaptive to the measured load conditions of the dispatch queue and the network quality. Moreover, the operation of the dispatch queue management engine 440 is configurable based upon an allowed dropped message rate and the setting of SIP timeout timer values.

With the illustrative embodiments, the dispatch queue SIP container measures the average UDP packet loss at low load times, i.e. the dispatch queue load or length q being less than a predetermined threshold, in order to get a measure of the network quality n, where n is the network packet loss in the range of 0 to 1. The network quality represents how likely a single UDP packet is to be lost throughout the container's operating environment.

For example, the dispatch queue management engine 440 may monitor the dispatch queue load or length q of the dispatch queue 430 and compare the load or length q to a predetermined threshold. When the value of q is less than this predetermined threshold, the dispatch queue management engine 440 may measure the network quality n. To measure the network quality, one need only determine the rate at which data packets are lost. Such measurements may be performed in a number of different ways depending upon the particular implementation. In one illustrative embodiment, such measurements may be performed by tracking how often a SIP server does not see retransmissions that it expects.

For example, assume that a UDP request should be transmitted initially and then retransmitted at 500 ms, 1000 ms, and 2000 ms. Further assume that the SIP server only sees a single transmission followed by a retransmission 1000 ms later, and finally followed by a retransmission 1000 ms after that. The SIP server may infer that the 500 ms retransmission was dropped. comparing the drop rate relative to the current network load provides an estimate of the network quality n. In other illustrative embodiments, empirical measurement or conservative estimates may be utilized to capture this parameter. Other mechanisms for determining a network quality n parameter will be apparent to those of ordinary skill in the art in view of this disclosure and may be utilized with the illustrative embodiments without departing from the spirit and scope of the present invention The dispatch queue management engine 440 of the SIP container 420 may calculate the likelihood that any given UDP packet is the last one transmitted before timeout, i.e. may calculate the SIP retransmission rate l in the range of 0 to 1. Such calculation may be performed without explicitly knowing if any particular UDP packet is a retransmission or not. This calculation may be based on SIP T1, T2, and 64*T1 request timeout timers. The setting of the T1 and T2 timers may be administrator configurable. For example, if T1 and T2 mandate that SIP gives 7 retransmissions, then any given UDP packet has a 1 in 7 chance of being the last one transmitted before a timeout for a given message. This assumes, however, that SIP clients always perform the number of retransmissions mandated by the protocol.

The dispatch queue management engine 440 of the SIP container 420 may utilize a specified allowable dropped message rate, d, which may be related to application reliability requirements. This specified allowable dropped message rate d may be input to the SIP container 420 as a parameter set by an administrator or the like, the value of which may be determined in any manner suitable as determined by those of ordinary skill in the art. For example, an allowable dropped message rate may be provided as d=0.99999 meaning that 99.999% of all messages need to be processed successfully.

The dispatch queue management engine 440 of the SIP container 420 may further determine the present dispatch queue 430 length and may further be provided with the maximum fixed dispatch queue size, i.e. a parameter set in the configuration of the SIP architecture. With this information, the SIP container 420 may measure how full the dispatch queue is, i.e. the dispatch queue load q, as a measure from 0 to 1.

These parameters, q, n, l and d, may obtained or calculated based on information obtained from a configuration data structure 460 that may be maintained in the SIP application server, for example. These parameters may be fed by the dispatch queue management engine 440 of the SIP container 420 to a specified drop function $f(q, n, l, d)$ which gives the probability that the SIP container 420 will keep any given UDP packet for a known dispatch queue 430 load (or length), network packet loss, SIP retransmission rate, and allowable dropped message rate. This specified drop function may take the form, for example, of $f(q)=(1-q)^c$ where $c<1$ and depends on n, l and d. This function results in UDP packets being dropped more frequently as the load on the dispatch queue increases.

Of course, this is just one example of a drop function that may be utilized to achieve a desired SIP container 420 operation under bursty loads. Other functions may be utilized without departing from the spirit and scope of the present invention.

With the drop function in place, the dispatch queue management engine 440 of the SIP container 420 will automatically place any incoming TCP packets into the dispatch queue since dropping a TCP packet automatically fails a communication. The dispatch queue management engine 440 of the SIP container 420 may, however, generate a random number r in the range from 0 to 1 which is used to determine whether to drop UDP packets or not. The dispatch queue management engine 440 may calculate the value for $f(q, n, l, d)$ given the instantaneous dispatch queue load or length q, the network quality n, and the fixed l and d values.

Any incoming UDP packet may be kept and inserted into the dispatch queue 430 if $r<f$. If $r>f$, then the UDP packet is discarded because it has been determined, statistically, that by doing so an unacceptable number of communications will not be failed. In a preferred illustrative embodiment, the random number r may be determined, for example, once for every incoming UDP packet. In addition, the function f may also be evaluated once for every incoming UDP packet and the comparison of r to f may be performed for every UDP packet. However, it should be appreciated that in other illustrative embodiments the r and f values and the comparison may be performed with more or less frequency than once for every incoming UDP packet.

It should be noted that, rather than calculating the value of $f(\ )$ for each determination, a lookup table data structure 470 may be provided and stored in memory for use in performing the determinations as to whether to drop or keep UDP packets. The $f(\ )$ value may be determined by maintaining n, l, and d fixed and using the dispatch queue load or length q as an index into the lookup table. Multiple lookup table data structures 470 may further be provided, one for each predetermined n value, for example. Thus, a particular lookup table data structure 470 may be selected based on a determined n value and then indexed by the q value.

Thus, assuming that the dispatch queue 430 is currently in an overloaded or imminent overload state, when a packet is received in the SIP container 420, the dispatch queue management engine 440 first determines whether the packet is a TCP or UDP packet by looking at fields of the packet header. If the packet is a TCP packet, the packet is automatically added to the dispatch queue 430. If the packet is a UDP packet, a value for the function $f(q, n, l, d)$ is calculated or looked up and a random number is generated. If the random number is less than the value of $f(q, n, l, d)$, then the UDP packet is added to the dispatch queue 430. If the random number is greater than the value of $f(q, n, l, d)$, then the UDP packet is discarded. It should be appreciated that the value for $f(q, n, l, d)$ is based on the current dispatch queue load, the network quality, the retransmission rate, and the allowable drop rate. Thus, the determination as to whether to drop UDP packets or not is configurable by an administrator and also adaptable to the current network and dispatch queue conditions.

Effectively, the function $f(q, n, l, d)$ states that given what is known about the network, the SIP protocol, the dispatch queues loading, and the reliability requirements, with what probability should processing a packet be skipped because it is expected (with d certainty) that a retransmission of the packet will be processed prior to the request timing out. With this function, as the dispatch queue load increases, UDP packets are more aggressively dropped under the assumption that retransmissions of these UDP packets will be seen later (when presumably there is less load). Because the dropping behavior is adaptively changed based on known factors, one can control the risk that processing of a request will fail outright based on operational needs.

Altogether, one can reduce the number of physical systems needed to handle SIP traffic with bursty behavior using the mechanisms of the illustrative embodiments. As a result, the illustrative embodiments improve the perceived system performed and reduce the number of systems necessary to handle fairly constant load with somewhat spiky moments.

Figure 5:
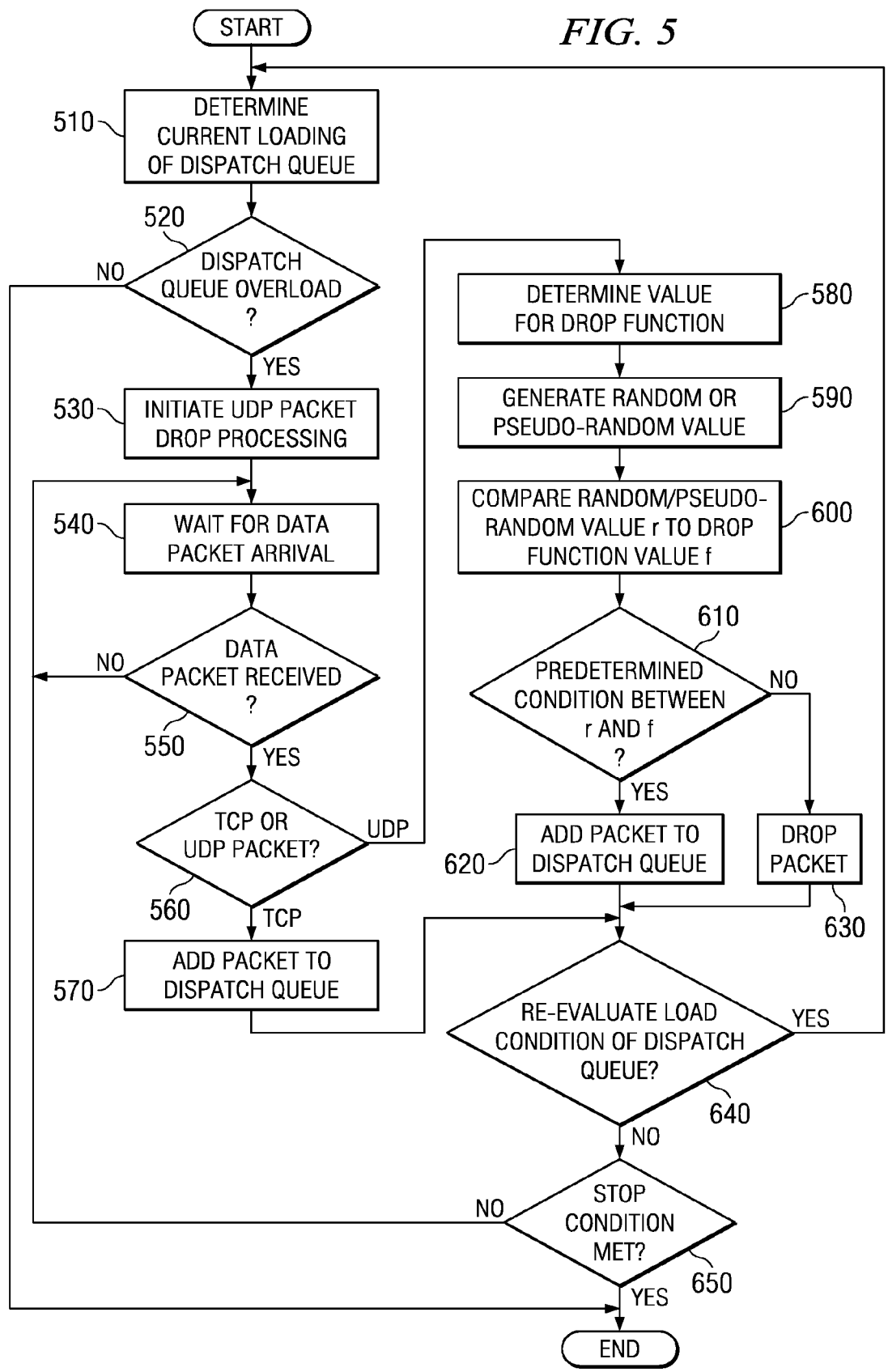
FIG. 5 is a flowchart outlining an exemplary operation of one illustrative embodiment for managing a dispatch queue of a SIP container with regard to overload conditions.

FIG. 5 is a flowchart outlining an exemplary operation of one illustrative embodiment for managing a dispatch queue of a SIP container with regard to overload conditions. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 5, the operation starts by the dispatch queue management engine of the SIP container determining the current loading of the dispatch queue (step 510). The dispatch queue management engine determines whether the dispatch queue is in an overload state or imminent overload state (step 520). If not, the operation terminates but may be reinitiated at a later time, such as at a subsequent time to evaluate the loading of the dispatch queue. Otherwise, if the dispatch queue is in an overload or imminent overload state, the dispatch queue management engine initiates UDP packet drop processing (step 530) and waits for a packet to arrive (step 540).

When a packet arrives in the SIP container (step 550), the dispatch queue management engine determines whether the packet is a TCP packet or a UDP packet (step 560). If the packet is a TCP packet, the packet is added to the dispatch queue (step 570). If the packet is a UDP packet, a value of a drop function $f(q, n, l, d)$ is determined through calculation, lookup table, or the like (step 580). The determination of the drop function value may be based on the current loading of the dispatch queue as determined in step 510, the network quality as previously determined during a time of low load on the dispatch queue, the retransmission rate (which may be a fixed value), and the allowable drop rate (which may also be a fixed value).

The dispatch queue management engine may then generate a random or pseudo-random number r (step 590). The dispatch queue management engine compares the random or pseudo-random number r to the drop function value f (step 600) and determines if a predetermined condition between r and $f$ is met, e.g., $r<f$, $r>f$, or the like (step 610). If the predetermined condition is met, then the dispatch queue management engine adds the UDP packet to the dispatch queue (step 620). Otherwise, if the predetermined condition is not met, the UDP packet is dropped (step 630).

The dispatch queue management engine may then determine if it is time to re-evaluate the load condition of the dispatch queue (step 640). If so, the operation may return to step 510. Such a determination may be made based upon a timer condition, a user input, or any other suitable event for informing the dispatch queue management engine to re-evaluate the load condition of the dispatch queue.

If it is not time to re-evaluate the load condition of the dispatch queue, the dispatch queue management engine may determine if a stop condition has occurred (step 650). This stop condition may be, for example, a user input instructing the dispatch queue management engine to discontinue its operation. If a stop condition has occurred, the operation terminates. Otherwise, if the stop condition has not occurred, the operation returns to step 540 and awaits the next data packet.

Thus, the mechanisms of the illustrative embodiments allows UDP packets to be dropped while TCP packets are automatically added to a dispatch queue during overload or imminent overload conditions, such as may be experienced during traffic bursts. The retransmission characteristics of UDP packets make it likely that any given dropped UDP packet will have a high likelihood of being retransmitted and thus, few communications will be lost by implementing the mechanisms of the illustrative embodiments.

It should be appreciated that many modifications to the above described mechanisms may be made without departing from the spirit and scope of the present invention. For example, while the above illustrative embodiments are described in terms of a function $f$ in which the input parameters are q, n, l, and d, other input parameters may be utilized in addition to or in replacement of these already described input parameters. Such other input parameters may be based on, for example, configuration time or dynamically calculated settings.

Under some conditions, the above mechanisms may result in UDP packet processing starvation by TCP packets. That is, under certain conditions most of the UDP packets may be dropped and thus, UDP packet processing will not occur as often as necessary. Various mechanisms may be employed for ensuring that such UDP packet processing starvation is not encountered. For example, a count of the number of UDP packets dropped may be maintained by the dispatch queue management engine and when that count reaches a predetermined threshold, UDP packet dropping may be discontinued, a weighting factor may be applied to the drop function calculation to reduce UDP packet drops, or the like.

Moreover, it should be considered that just because a SIP container's dispatch queue is loaded to a particular q value at the current time does not mean that it will be this same q value when the next retransmission of a UDP packet occurs. Thus, it may be beneficial to incorporate a load history, i.e. a q value history or q versus time, model into the dispatch queue management engine. In a simple implementation, an average of the q value over a particular period of time may be utilized. However, in other implementations, a more complex determination of the load history and its affect on whether to drop UDP packets or not may be incorporated into the mechanisms of the illustrative embodiments.

For example, some approaches to incorporating a load history into the mechanisms of the illustrative embodiments may comprise including rates of change in the load (e.g., first, second, etc., derivative of load with respect to time). Other approaches may incorporate calendar/wall time, e.g., Monday at lunch may be particularly bad for traffic and thus, more aggressive smoothing using the mechanisms of the illustrative embodiments may be required.

Furthermore, in still other approaches, load information may be incorporated from other related systems, e.g., the SIP container may know it can handle the load, but a related media server it is used cannot and thus, the SIP container may smooth the load to shelter the media server. In other approaches, load considerations from non-SIP messages may be included in the mechanisms of the illustrative embodiments, e.g., for a Web service oriented system, the SIP container may more aggressively smooth SIP traffic because it is experiencing a Web service traffic spike. In each of these above approaches, commonly accessible runtime characteristics for each approach may be gathered, in a manner that would be readily apparent to those of ordinary skill in the art, and may be input to the function $f$ of the illustrative embodiments in order to determine the smoothing needed.

As a further modification, while the dispatch queue management engine has been described as being part of the SIP container and operating directly on the dispatch queue of the SIP container, the illustrative embodiments are not limited to such. Rather, the dispatch queue management engine may be incorporated into a load balancing layer of the SIP architecture, for example. Thus, the dispatch queue management engine's functionality may be incorporated into a load balancer system or SIP proxy so long as the dispatch queue management engine still has access to knowledge of the SIP container's instantaneous load, such as via notification messages from the SIP container to the load balancer system or SIP proxy.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for managing a dispatch queue, comprising:

determining a drop function value based on a current loading of the dispatch queue;

evaluating the drop function value to determine if one or more data packets are to be dropped; and dropping one or more data packets of a first type if the evaluation indicates that one or more data packets are to be dropped, wherein:

data packets eta second type are always added to the dispatch queue regardless of whether the evaluation indicates that one or more data packets are to be dropped, and the drop function specifies a probability that a Session Initiation Protocol (SIP) container will keep any given User Datagram Protocol (UDP) packet for a determined dispatch queue length.

2. The method of claim 1, wherein evaluating the drop function value comprises:

generating a random or pseudo-random value;

comparing the random or pseudo-random value to the drop function value; and determining that one or more data packets are to be dropped if a predetermined relationship between the random or pseudo-random value and the drop function value exists.

3. The method of claim 2, wherein the predetermined relationship is that the random or pseudo-random value is greater than the drop function value.

4. The method of claim 1, wherein the method is implemented in a Session Initiation Protocol (SIP) container.

5. The method of claim 1, wherein the drop function value is determined using a drop function that operates on one or more network loss and system load characteristic parameters.

6. The method of claim 5, wherein the network loss characteristic parameter is measured as an average packet loss at a point in time where a dispatch queue length is less than a predetermined threshold, and wherein the system load characteristic parameter is determined dynamically.

7. The method of claim 5, wherein the drop function results in UDP packets being dropped more frequently as the system load increases.

8. The method of claim 1, wherein the drop function value is determined based on a function of the current loading of the dispatch queue, a network quality value, a retransmission rate value, and an allowable drop rate value.

9. The method of claim 8, wherein the function is:

$$f(q)=(1-q)^c$$

wherein q is the current loading of the dispatch queue, and wherein c<1 and c depends on the network quality value, the retransmission rate value, and the allowable drop rate value.

10. The method of claim 1, wherein data packets of the first type are User Datagram Protocol (UDP) data packets and data packets of the second type are Transport Control Protocol (TCP) data packets.

11. The method of claim 1, wherein the method is performed in response to a determination of a state indicative of an overload or imminent overload of the dispatch queue.

12. The method of claim 1, wherein determining a drop function value based on a current loading of the dispatch queue comprises performing a lookup operation on one or more lookup table data structures based on a current loading of the dispatch queue.

13. A non-transitory computer readable medium encoded with a computer readable program, wherein the computer readable program, when executed on a computing device, causes the computing device to:

determine a drop function value based on a current loading of the dispatch queue;

evaluate the drop function value to determine if one or more data packets are to be dropped; and drop one or more data packets of a first type if the evaluation indicates that one or more data packets are to be dropped, wherein:

data packets of a second type are always added to the dispatch queue regard less of whether the evaluation indicates that one or more data packets are to be dropped, and the drop function specifies a probability that a Session Initiation Protocol (SIP) container will keep any given User Datagram Protocol (UDP) packet for a determined dispatch queue length.

14. The computer readable medium of claim 13, wherein the computer readable program causes the computing device to evaluate the drop function value by:

generating a random or pseudo-random value;

comparing the random or pseudo-random value to the drop function value; and determining that one or more data packets are to be dropped if a predetermined relationship between the random or pseudo-random value and the drop function value exists.

15. The computer readable medium of claim 14, wherein the predetermined relationship is that the random or pseudo-random value is greater than the drop function value.

16. The computer readable medium of claim 13, wherein the computer readable program is executed as part of a Session Initiation Protocol (SIP) container.

17. The computer readable medium of claim 13, wherein the drop function value is determined using a drop function that operates on one or more network loss and system load characteristic parameters.

18. The computer readable medium of claim 17, wherein the network loss characteristic parameter is measured as an average packet loss at a point in time where a dispatch queue length is less than a predetermined threshold, and wherein the system load characteristic parameter is determined dynamically.

19. The computer readable medium of claim 17, wherein the drop function results in UDP packets being dropped more frequently as the system load increases.

20. The computer readable medium of claim 13, wherein the drop function value is determined based on a function of the current loading of the dispatch queue, a network quality value, a retransmission rate value, and an allowable drop rate value.

21. The computer readable medium of claim 20, wherein the function is:

$$f(q)=(1-q)^c$$

wherein q is the current loading of the dispatch queue, and wherein c<1 and c depends on the network quality value, the retransmission rate value, and the allowable drop rate value.

22. The computer readable medium of claim 13, wherein data packets of the first type are User Datagram Protocol (UDP) data packets and data packets of the second type are Transport Control Protocol (TCP) data packets.

23. The computer readable medium of claim 13, wherein the computer readable program is executed by the computing device in response to a determination of a state indicative of an overload or imminent overload of the dispatch queue.

24. The computer readable medium of claim 13, wherein the computer readable program causes the computing device to determine a drop function value based on a current loading of the dispatch queue by performing a lookup operation on one or more lookup table data structures based on a current loading of the dispatch queue.

25. An apparatus comprising:

a processor; and a memory coupled to the processor, wherein the memory comprises instructions which, when executed by the processor, cause the processor to:

determine a drop function value based on a current loading of a dispatch queue associated with the processor;

evaluate the drop function value to determine if one or more data packets are to be dropped; and drop one or more data packets eta first type if the evaluation indicates that one or more data packets are to be dropped, wherein:

data packets of a second type are always added to the dispatch queue regardless of whether the evaluation indicates that one or more data packets are to be dropped, and the drop function specifies a probability that a Session Initiation Protocol (SIP) container will keep any given User Datagram Protocol (UDP) packet for a determined dispatch queue length.

26. The apparatus of claim 25, wherein the instructions cause the processor to evaluate the drop function value by:

generating a random or pseudorandom value;

comparing the random or pseudo-random value to the drop function value; and determining that one or more data packets are to be dropped if a predetermined relationship between the random or pseudo-random value and the drop function value exists.

27. The apparatus of claim 26, wherein the predetermined relationship is that the random or pseudo-random value is greater than the drop function value.

28. The apparatus of claim 25, wherein the instructions are executed by the processor as part of a Session Initiation Protocol (SIP) container.

29. The apparatus of claim 25, wherein the drop function value is determined using a drop function that operates on one or more network loss and system load characteristic parameters.

30. The apparatus of claim 29, wherein the network loss characteristic parameter is measured as an average packet loss at a point in time where a dispatch queue length is less than a predetermined threshold, and wherein the system load characteristic parameter is determined dynamically.

31. The apparatus of claim 29, wherein the drop function results in UDP packets being dropped more frequently as the system load increases.

32. The apparatus of claim 25, wherein the drop function value is determined based on a function of the current loading of the dispatch queue, a network quality value, a retransmission rate value, and an allowable drop rate value.

33. The apparatus of claim 25, wherein data packets of the first type are User Datagram Protocol (UDP) data packets and data packets of the second type are Transport Control Protocol (TCP) data packets.

34. The apparatus of claim 25, wherein the instructions are executed by the processor in response to a determination of a state indicative of an overload or imminent overload of the dispatch queue.

35. The apparatus of claim 25, wherein the instructions cause the processor to determine a drop function value based on a current loading of the dispatch queue by performing a lookup operation on one or more lookup table data structures based on a current loading of the dispatch queue.

* * * * *